United States Patent
Bland et al.

(10) Patent No.: US 10,452,371 B2
(45) Date of Patent: Oct. 22, 2019

(54) AUTOMATING ENABLEMENT STATE INPUTS TO WORKFLOWS IN Z/OSMF

(71) Applicant: INTERNATIONAL BUSINESS MACHINES CORPORATION, Armonk, NY (US)

(72) Inventors: Donald J. Bland, Marlboro, NY (US); John Bouzakis, Poughkeepsie, NY (US); Keith J. Miller, Pawling, NY (US); Marna L. Walle, Pawling, NY (US)

(73) Assignee: International Business Machines Corporation, Armonk, NY (US)

( * ) Notice: Subject to any disclaimer, the term of this patent is extended or adjusted under 35 U.S.C. 154(b) by 196 days.

(21) Appl. No.: 15/185,918

(22) Filed: Jun. 17, 2016

(65) Prior Publication Data

US 2017/0364390 A1   Dec. 21, 2017

(51) Int. Cl.
*G06F 8/60* (2018.01)

(52) U.S. Cl.
CPC ..................... *G06F 8/60* (2013.01)

(58) Field of Classification Search
CPC ........................................................ G06F 8/60
See application file for complete search history.

(56) References Cited

U.S. PATENT DOCUMENTS

| | | | |
|---|---|---|---|
| 6,237,144 B1 | 5/2001 | Delo | |
| 8,813,066 B2 | 8/2014 | Allocca et al. | |
| 9,578,063 B1* | 2/2017 | Iyer | G06F 16/2358 |
| 9,886,348 B2* | 2/2018 | Rath | G06F 17/30557 |
| 2012/0185843 A1* | 7/2012 | Burke | G06F 8/61 717/174 |
| 2012/0290583 A1* | 11/2012 | Mahaniok | G06F 8/60 707/741 |
| 2014/0123126 A1* | 5/2014 | Hsu | G06F 8/61 717/174 |
| 2016/0132808 A1* | 5/2016 | To | G06Q 10/06315 705/7.25 |
| 2016/0188721 A1* | 6/2016 | Glover | G06F 17/30864 707/706 |

FOREIGN PATENT DOCUMENTS

GB   2394570 A   4/2004

OTHER PUBLICATIONS

Singh et al., IBM rebooks—"IBM z/OS Management Facility V2R1", Mar. 2014.*

(Continued)

*Primary Examiner* — Francisco J Aponte
*Assistant Examiner* — Kevin X Lu
(74) *Attorney, Agent, or Firm* — Brian M. Restauro, Esq.; Hye Jin Lucy Song; Heslin Rothenberg Farley & Mesiti, PC

(57) ABSTRACT

Methods, computer program products, and systems are presented. The methods include, for instance: automatically discovering enablement state variables respectively corresponding to products present in a computer system; processing the enablement state variables and associated values and making a separate file for disabled products; and make available the file for disabled products as inputs to subsequent system administration jobs.

19 Claims, 8 Drawing Sheets

(56) References Cited

OTHER PUBLICATIONS

Various authors, "Command that lets me know all products installed", www.ibmmainframeforum.com/operating-systems/topic186.html, Jan. 2008.*

Unknown Author, "IBM Knowledge Center—IFA111L", 2014, www.ibm.com/support/knowledgecenter/en/SSLTBW_2.1.0/com.ibm.zos.v2r1.ieam800/ll111i.htm.*

Unknown Author, IBM Knowledge Center—Making a step conditional, www.ibm.com/support/knowledgecenter/en/SSLTBW_2.3.0/com.ibm.zos.v2r3.izua700/izuprog_WorkflowsXML_StepsConditional.htm, 2014.*

Unknown Author, "MVS System Commands Version 2 Release 1", 2015 (Year: 2015).*

Deedwaniya et al., "The new z/OSMF Workflows Feature Optimizes Sets of System Programming Tasks", Sep. 2014 (Year: 2014).*

Miller et al, "Discovery.txt", github.com/IBM/IBM-Z-zOS/blob/master/zOS-Workflow/zOS%20z14%20Workflow/discovery.txt, created on Jun. 3, 2015 (Year: 2015).*

Keith Miller, "The Manipulation of a Step's Status in z/OSMF Work-flows Through Variable Passing", Jun. 21, 2015—Grace Period Disclosure under 35 USC 102(b)(1)(a), 9 pages.

Mell et al., "The NIST Definition of Cloud Computing", National Institute of Standards and Technology, U.S. Department of Commerce, NIST Special Publication 800-145, Sep. 2011, 7 pages.

* cited by examiner

```
L101:   > D PROD, STATE

L102:   S . . .    NAME       FEATURE              . . .
L103:   E . . .    z/OS       z/OS                 . . .
L104:   E . . .    z/OS       BDTFTP               . . .
L105:   E . . .    z/OS       BDTNJE               . . .
L106:   E . . .    z/OS       BOOKMGR BUILD        . . .
L107:   E . . .    z/OS       C/C++                . . .
L108:   E . . .    z/OS       GDDM-REXX            . . .
L109:   E . . .    z/OS       HCM                  . . .
L110:   E . . .    z/OS       INFOPRINT SERVER     . . .
L111:   E . . .    z/OS       JES3                 . . .
L112:   E . . .    z/OS       TCP/IP CICS          . . .
L113:   E . . .    z/OS       TCP/IP IMS           . . .
        . . .
L114:   D . . .    GDDM-PGF   GDDM-PGF             . . .
```

FIG. 3

AUTOMATING ENABLEMENT STATE INPUTS TO WORKFLOWS IN Z/OSMF

STATEMENT REGARDING PRIOR DISCLOSURES BY THE INVENTOR OR A JOIN INVENTOR

The following disclosure is submitted under 35 U.S.C. 102(b)(1)(A): The Manipulation of a Step's Status in z/OSMF Work-flows Through Variable Passing, Keith Miller, Jun. 21, 2015, 9 pages

TECHNICAL FIELD

The present disclosure relates to mainframe job control, and more particularly to methods, computer program products, and systems for efficiently performing system administration tasks for a mainframe computer in the context of installation, configuration, and migration of the mainframe computer by use of tools provided in the mainframe computer.

BACKGROUND

As mainframe computers have numerous program components that could be purchased from a wide variety of products, tools, and/or subsystems, a composition of such optional elements of an individual mainframe computer can be extremely diverse from one mainframe to the next. Accordingly, system administration tasks that must be performed during installation, configuration, and migration of the individual mainframe computer become time-consuming and inefficient for a system administrator to find out the composition of the optional elements for the individual mainframe computer

SUMMARY

The shortcomings of the prior art are overcome, and additional advantages are provided, through the provision, in one aspect, of a method. The method for automating enablement state inputs to workflows includes, for example: automatically discovering, by one or more processor of a computer, respective values for one or more enablement state variable respectively corresponding to one or more product installed in the computer, wherein a value of a enablement state variable from the one or more enablement state variable indicates whether a product corresponding to the enablement state variable is enabled in the computer; loading, by the one or more processor, the one or more enablement state variable and the discovered respective values of the one or more enablement state variable to a first list; parsing, by the one or more processor, the loaded first list for each of the one or more enablement state variable and the discovered respective values; recording, by the one or more processor, to a second list, a first enablement state variable and a value corresponding to the first enablement state variable in the first list based on ascertaining that a first product corresponding to the first enablement state variable is disabled in the computer; and writing, by the one or more processor, the second list to an output file such that respective enablement state corresponding to one or more disabled product represented in the output file may be automatically provided to subsequent system administration jobs by user of respective enablement state variable corresponding to the one or more disabled product.

Additional features are realized through the techniques set forth herein. Other embodiments and aspects, including but not limited to computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 3 depicts a result of a system command "D PROD" as provided by the z/OS mainframe 230, in accordance with one or more embodiments set forth herein;

DETAILED DESCRIPTION

Figure 1:
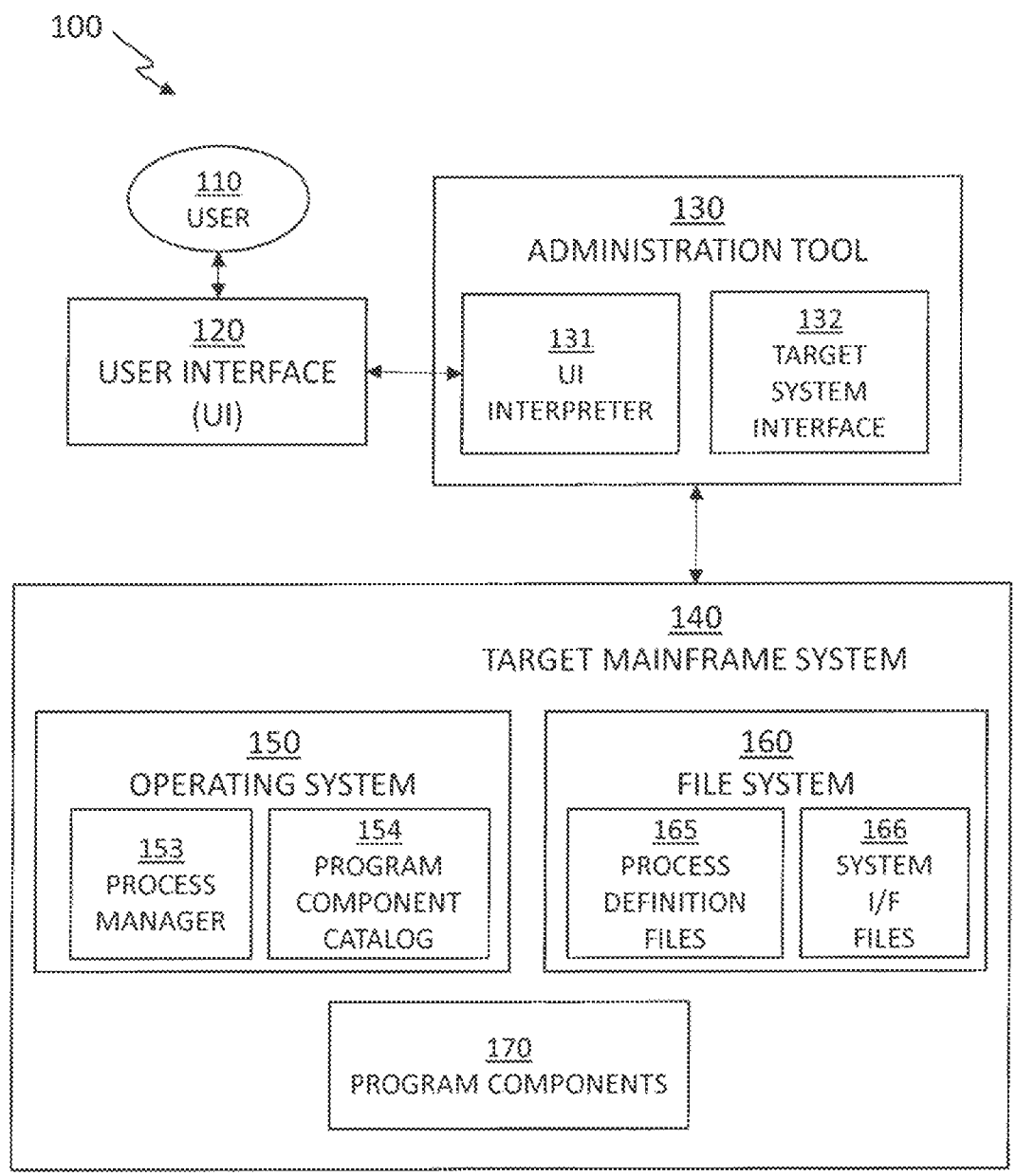
FIG. 1 depicts a system diagram for a generic system administration environment for a target mainframe system, in accordance with one or more embodiments set forth herein.

FIG. 1 depicts a system diagram for a generic system administration environment 100 for mainframe systems, in accordance with one or more embodiments set forth herein.

The generic system administration environment 100 includes a user 110, a user interface (UI) 120, an administration tool 130, and a target mainframe system 140. The user 110 is a system administrator who performs system administration tasks of installation, configuration, and migration for the target mainframe system 140. The user 110 has a proper authentication to alter system parameters and configurations and to read/write system files of the target mainframe system 140 via the user interface 120 and the administration tool 130.

The administration tool 130 includes a user interface interpreter 131 and a target system interface 132. The user interface interpreter 131 takes inputs from the user interface 120 and converts the inputs for the target mainframe system 140, by changing formats for commands and data from the formats of the UI 120 to the formats corresponding to the target mainframe system 140. The target system interface 132 obtains the commands and data suitable for the target mainframe system 140 and manages system administration tasks, executes system programs on the target mainframe system 140, and accesses system data according to the obtained commands and data.

The target mainframe system 140 includes an operating system 150, a file system 160, and may include one or more program component 170. The operating system 150 manages internal workings of the target mainframe system 140. The operating system 150 includes a process manager 153 and a program component catalog 154. The process manager 153 manages scheduling and execution of processes in the target mainframe system 140. The program component catalog 154 keeps record of the one or more program components 170 that are installed in the target mainframe system 140. Examples of the program component catalog 154 may be, a parameter library of z/OS® operating system, Registry of Windows® operating system, etc. (z/OS is a registered trademark of International Business Machines, Corporation in the United States and other countries; Windows is a registered trademark of Microsoft Corporation in the United States and other countries) The one or more program components 170 may be a program product that can be separately purchased, a secondary subsystem of the target mainframe system 140, etc.

The file system 160 includes process definition files 165 and system interface files 166. The process definition files 165 define respective system administration task processes for the target mainframe system 140 that will be performed by use of the process manager 153 of the operating system 150. The system interface files 166 respectively set input or output files for specific system administration task processes as defined by the administration tool 130 and the target system interface 132.

The user interface 120 and the administration tool 130 may run on the target mainframe system 140 or on a combination of respective computer systems separate from the target mainframe system 140. In one embodiment of the present invention, the user interface 120 runs on a user computer system, the administration tool 130 runs on an administrator computer system, in managing the target mainframe system 140. In another embodiment of the present invention, both the user interface 120 and the administration tool 130 run on the target mainframe system 140 along with other programs. In still another embodiment of the present invention, the user interface 120 runs on a user computer system, and the administration tool 130 runs on the target mainframe system 140 as the administration tool 130 is a part of the operating system 150 of the target mainframe system 140.

Figure 2:
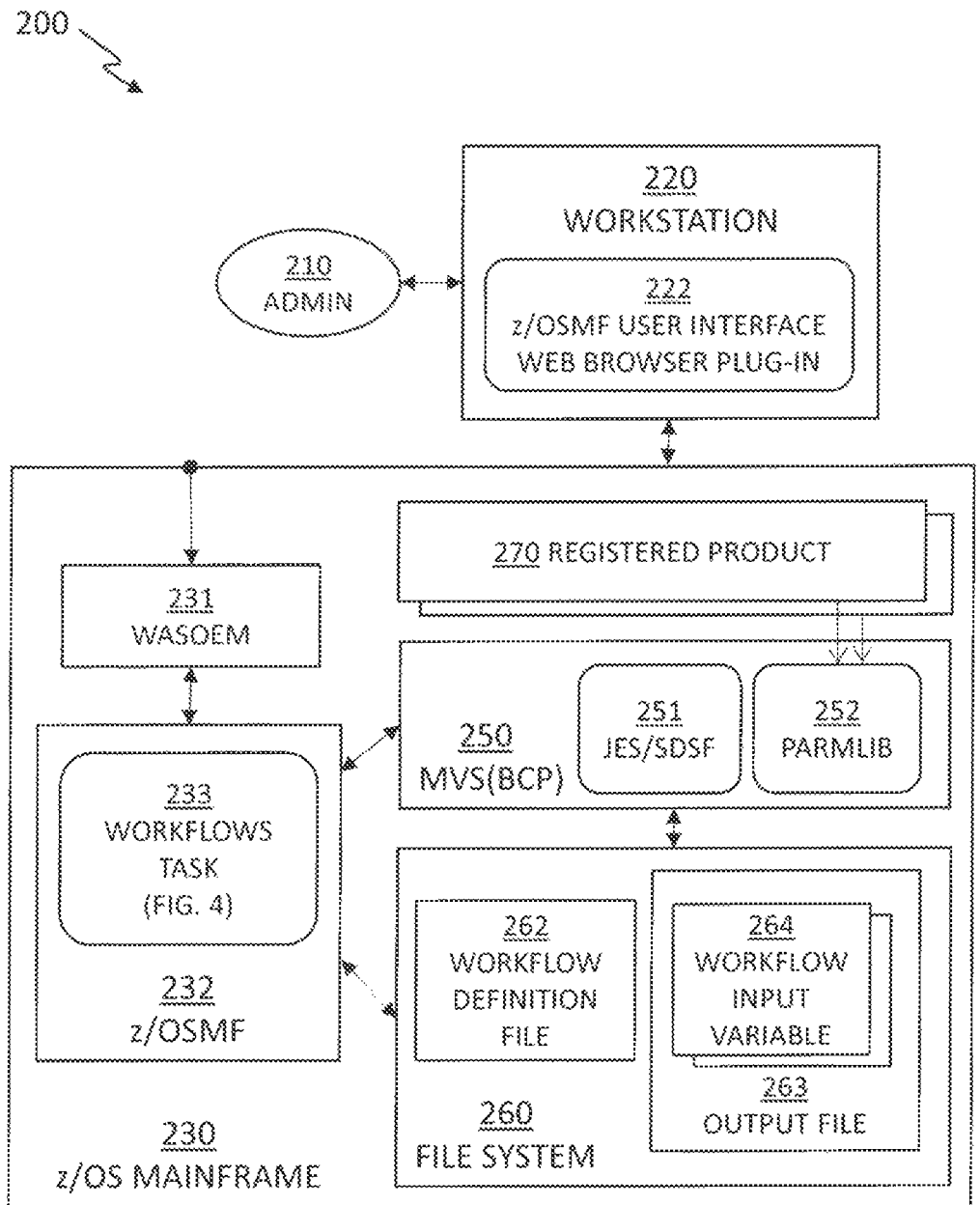
FIG. 2 a system diagram for a z/OS system administration environment for an IBM z System mainframe, in accordance with one or more embodiments set forth herein.

FIG. 2 depicts a system diagram for a z/OS system administration environment 200 for a z/OS mainframe 230, in accordance with one or more embodiments set forth herein.

The z/OS system administration environment 200 for the z/OS mainframe 230 includes a system administrator 210, a workstation 220, and the z/OS mainframe 230. The system administrator 210 performs system administration tasks of installation, configuration, and migration for the z/OS mainframe 230 by use of the workstation 220 that runs a z/OS Management Facility (z/OSMF) user interface web browser plug-in 222. The workstation 220 is any kind of computer system that has processing unit and storage to run the z/OSMF UI web browser plug-in 222. The system administrator 210 has a proper authentication to alter system parameters and configurations and to read/write system files of the z/OS mainframe 230 via the z/OSMF user interface web browser plug-in 222 that interacts with z/OSMF 232 of the z/OS mainframe 230. The z/OSMF user interface web browser plug-in 222 is an example of the user interface 120 of FIG. 1.

The z/OS mainframe 230 is an example of the target mainframe system 140 in FIG. 1. The z/OS mainframe 230 indicates an IBM z™ family mainframe computer that is also referred to as z Systems™ or System z®. (IBM and System z are registered trademarks of International Business Machines, Corporation in the United States and other countries; z Systems is a trademark of International Business Machines, Corporation in the United States and other countries)

The z/OS mainframe 230 includes a Web Sphere® Application Server (WAS) original equipment manufacturer (OEM) 231, the z/OS Management Facility (z/OSMF) 232, a version of z/OS operating system referred to as MVS™ (BCP) 250, a UNIX® file system 260, and one or more registered product 270. (UNIX is a registered trademark in the United States and other countries, licensed exclusively through X/Open Company Ltd.; Web Sphere is a registered trademark of, and MVS is a trademark of International Business Machines, Corporation in the United States and other countries)

The WASOEM 231 is an example of the administration tool 130 and the user interface interpreter 131 of FIG. 1, the z/OSMF 232 is an example of the administration tool 130 and the target system interface 132 of FIG. 1, the MVS (BCP) is an example of the operating system 150 of FIG. 1, and the UNIX file system 260 is an example of the file system 160 of FIG. 1.

The WASOEM 231 indicates the IBM Web Sphere Application Server OEM Edition for z/OS configuration script, WASOEM.sh, which facilitates communication between the z/OSMF user interface web browser plug-in 222 and the z/OSMF 232. TOMCAT® may be another example of the user interface interpreter 131 of FIG. 1 for several proprietary software implementation. (TOMCAT is a registered trademark of the Apache Software Foundation in the United States)

The z/OS Management Facility (z/OSMF) 232 includes a Workflows task 233. The z/OSMF 232 provides a framework for managing various aspects of the z/OS mainframe 230 through a web browser interface, shown as z/OSMF user interface web browser plug-in 222. By streamlining and/or automating system administration tasks by use of a task-oriented approach, the z/OSMF 232 may simplify some areas of system management and reduce the level of expertise needed for managing the z/OS mainframe 230. The z/OSMF 232 is intended to serve as a single platform for hosting the web-based administrative console functions of IBM server, software, and storage products. The z/OSMF 232 facilitates system administrators and system programmers to easily manage the day-to-day operations and administration of the z/OS mainframe 230 by use of the task-oriented and web-browser based user interface with integrated user assistance. The z/OSMF 232 provides a single point of control for performing common system administration tasks referred to as workflows.

In this specification, the term "workflow" refers to an activity that is associated with the z/OSMF 232 such as configuring a component or product. The term "workflow" may further refer to the instantiation of a workflow in the z/OSMF 232 based on a workflow definition. The Workflows task 233 creates an instance of a workflow from a workflow definition file 262 from the UNIX file system 260. The workflow consists of one or more steps to be performed on z/OS mainframe 230, according to the workflow definition provided in the workflow definition file 262. The workflow definition file 262 may be an example of the process definition file 165 of FIG. 1.

Generally in the z/OS mainframe 230 context, the workflow definition file 262 is a primary extensible markup language (XML) file for a workflow definition. A workflow is stored in z/OSMF 232 when the workflow definition file 262 is imported into the Workflows task 233. A workflow definition stored in the workflow definition file 262 is a logical structure of the workflow, represented as a series of one or more steps. The workflow definition identifies various system objects and actions that constitute activities on z/OS mainframe 230 and rules for performing such activities. The workflow definition includes all of the information that is specified in, or referenced by, the workflow definition file 262 and possibly other files that are included by the workflow definition file 262. The workflow definition typically includes information about the workflow such as name and version, step definitions, variable definitions, file templates, and bundle files.

Upon importing the workflow definition file 262, the Workflows task 233 may also import a workflow variable input file that supplies default values for that one or more workflow input variable 264 as defined in the workflow definition file 262. The workflow variable input file is specified as an input when the workflow definition is imported into the Workflows task 233. The workflow variable input file is typically provided by a workflow provider to save users from having to manually enter inputs when they perform a workflow. By limiting user interaction, the workflow variable input file simplify the user experience of performing a workflow and reduce the opportunities for user error.

The UNIX file system 260 also includes an output file 263 that is created by a step in the workflow, and stores results of running a program such as a batch job, shell script, or Restructured Extended Executor programming language (REXX) exec program. The term "step" refers to a logical unit of work in the workflow that describes a specific activity to be performed on the z/OS mainframe 230. The output file 263 has one or more workflow input variable 264, of which values are set when the output file 263 is written to the UNIX file system 260. The output file 263 may be an example of the system interface file 166 of FIG. 1. When the step generating the output file 263 completes, the Workflows task 233 processes the output file 263 and makes any workflow input variables 264 in the output file 263 available for use by subsequent steps in the workflow instance or other workflows.

The MVS (BCP) 250 includes a Job Entry Subsystem/System Display and Search Facility (JES/SDSF) 251 and a parameter library (PARMLIB) 252, which are respective examples of the process manager 153 of FIG. 1 and the program component catalog 154 of FIG. 1, respectively.

The JES/SDSF 251 manages execution of jobs, including the workflow and steps by spooling, job queuing, and managing input and output (I/O) within the MVS (BCP) 250. The Job Entry Subsystem (JES) of the JES/SDSF 251 is a subsystem of the z/OS operating system, shown as MVS (BCS) 250, that receives jobs into the z/OS operating system, converts the jobs to internal format, selects the jobs in internal format for execution, processes respective outputs of the executed jobs, and purges the executed jobs and data from the z/OS operating system. In complexes that have several loosely-coupled processing units, a more advanced JES program manages processors such that a global processor exercises centralized control over local processors and distributes jobs to the local processors via a common job queue.

The System Display and Search Facility (SDSF) of the JES/SDSF 251 facilitate reviewing outputs of jobs submitted for execution, reviewing and correcting of Job Control Language (JCL) errors. By use of the SDSF, the system administrator 210 can display printed output held in the JES spool area and determine whether or not to keep the output for later use.

The parameter library (PARMLIB) 252, also referred to a program library in the MVS (BCP) 250, is a special catalog file of system settings for secondary subsystems of the z/OS mainframe 230. The PARMLIB 252 is a partitioned data set (PDS) having members respectively contain a program, part of a program, or data. A registered product 270, along with the Enabled/Disabled state of the registered product 270, is represented as a member in the PARMLIB 252, as shown by the arrows from the registered product 270 to the PARMLIB 252. The registered product 270 is an example of the program components 170 of FIG. 1.

In this specification, terms in the context of IBM z/OS "feature", "priced feature", "registered products", and "licensed program" are used interchangeably to indicate a product or an element of a product that may be separately ordered and purchased from available products provided by IBM, as used for the registered product 270. More specifically, a term "licensed program" indicates a software package that can be ordered from the program libraries, such as IBM Software Distribution (ISMD). Examples of licensed program may be, Information Management System (IMS) and Customer Information Control System (CICS). A registered product/licensed program are typically subsystems that are secondary or subordinate system to a primary/controlling system, providing programming support and usually capable of operating independently of or asynchronously with the controlling system.

FIG. 3 depicts a result of a system command "D PROD" as provided by the z/OS mainframe 230, in accordance with one or more embodiments set forth herein.

In line L101, the system administrator enters an MVS (BCP) system command DISPLAY (D), requesting to display information about registered products and the product enablement policy, in an administration console of the z/OS mainframe 230. In "D PROD, STATE", "D" is the MVS (BCP) system command DISPLAY, "PROD" indicates that the DISPLAY command is directed to information about registered products or the product enablement policy, and "STATE" indicates that the DISPLAY command is directed to information about the enablement state, defined in the enablement policy, for any matching products.

Lines L102 through L114 are result of the "D PROD, STATE" command issued to the z/OS in line L101.

In line L102, the MVS (BCP) prints heading for the columns in the result of lines L103 through L 114, including "S" indicating STATE, "NAME" indicating NAME, and "FEATURE" indicating FEATURENAME according to D PROD command syntax. The listing of FIG. 3 shows only the columns from D PROD command result that are relevant to the embodiments of the present invention, as indicated by ellipses ( . . . ).

"S" column holds a current enablement state value of a product on the system in each line, in lines L103 through L114. A STATE value "E" indicates that the product shown in the same line is enabled, and a STATE value "D" indicates that the product shown in the same line is disabled.

"NAME" column has names of the product sets installed in the target mainframe. A NAME value "z/OS" of lines L103 through L113 indicates that the product is the z/OS product set consisting of all z/OS elements and features and other products that is necessary for the z/OS product set or selectively installed with the z/OS product set. A NAME value "GDDM-PGF" of line L114 indicates that the product name is Graphical Data Display Manager (GDDM) Presentation Graphics Facility (PGF).

"FEATURE" column has names of elementary feature of respectively corresponding product sets, which is installed in the target mainframe. Lines L103 through L113 represents various features of the z/OS product set, z/OS operating system feature "z/OS" of line L103, Bulk Data Transfer (BDT) File-to-File feature "BDTFTF" of line L104, Bulk Data Transfer (BDT) Job Entry Subsystem 3 (JES3) Systems Network Architecture/Network Job Entry (SNA/NJE) feature "BDTNJE" of line L105, BookManager® BUILD feature "BOOKMGR BUILD" of line L106, C/C++ programming language feature "C/C++" of line L107, Graphical Data Display Manager (GDDM)-Restructured Extended Executor (REXX) feature "GDDM-REXX" of line L108, Hardware Configuration Manager (HCM) feature "HCM" of line L109, information display service feature "INFOPRINT SERVER" of line L110, Job Entry Subsystem 3 feature "JES3" of line L111, Transmission Control Protocol (TCP) and the Internet Protocol (IP) Customer Information Control System (CICS) feature "TCP/IP CICS" of line L112, and Transmission Control Protocol (TCP) and the Internet Protocol (IP) Information Management System (IMS) feature "TCP/IP IMS" of line L113, are all enabled. (BookManager is a registered trademark of International Business Machines, Corporation in the United States and other countries) GDDM-PGF feature of GDDM-PGF product presented in line L114 is disabled. As shown in FIG. 3, a name of a product may or may not be identical to a name of a feature, as some product may have multiple features and some product has only one feature.

Figure 4:
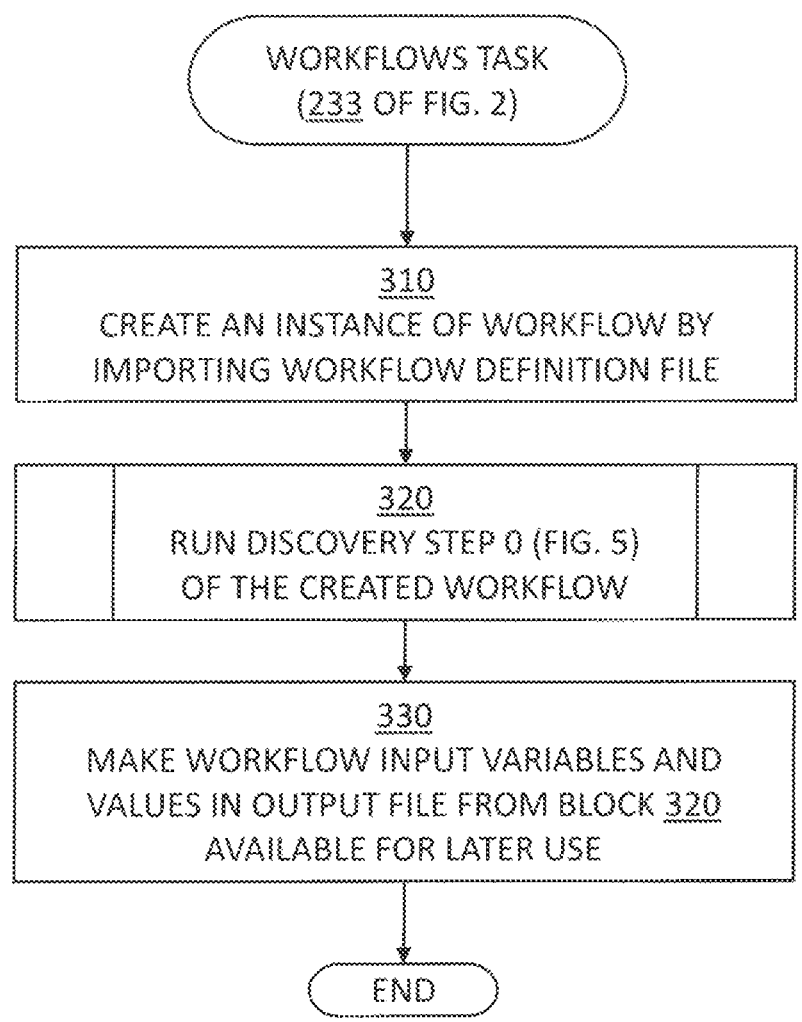
FIG. 4 depicts a flowchart performed by the Workflows Task 233 of FIG. 2 for managing workflow input variables for efficient system administration, in accordance with one or more embodiments set forth herein.

FIG. 4 depicts a flowchart performed by the Workflows Task 233 of FIG. 2 for managing workflow input variables for efficient system administration, in accordance with one or more embodiments set forth herein.

Prior to block 310, the workflow definition file had been generated in the file system by a system programmer or provided by a product/software package vendor, and made available for the system administrator to create a z/OSMF workflow according to the workflow definition file. In one embodiment of the present invention, variables in the workflow definition file are defined to respectively represent enablement state of a priced feature installed in the z/OS mainframe 230 such as JES3_state, by use of a respective name of the priced feature followed by "_state", to hold an enablement state value of "Enabled (E)" or "Disabled (D)" corresponding to the priced feature. The variables in the workflow definition file are workflow input variables that would be used as inputs for later steps and/or workflows. In the same embodiment, the workflow definition file is written in eXtensive Markup Language (XML) by a workflow author by use of an authoring tool running from a user workstation via the z/OSMF user interface web browser plug-in.

In block 310, the Workflows task of the z/OSMF creates a workflow in the z/OSMF by importing the workflow definition file prepared as described above. Then the Workflows task proceeds with block 320. The workflow has one or more units of work to be performed on the z/OS system, which is referred to as a Step. Each step in the workflow describes a specific activity to be performed on the system, and may be implemented as a separate program module.

In one embodiment of the present invention, the workflow includes a Step 0 at the beginning of the workflow, to check enablement state of all selective program components installed in the z/OS mainframe. As noted in the description of FIG. 2, terms "feature", "priced feature", "registered products", and "licensed program" in the IBM z/OS context are used interchangeably to indicate the selective program components. Workflows based on workflow definition files provided by software vendors/product manufacturers typically have a few hundred steps to cover all possible selective program components that may be installed in the z/OS mainframe. Accordingly, a system administrator need to input enablement state values respective to each selective program components that appear in such lengthy workflows based on vendor-provided workflow definition files, in order to properly configure the z/OS mainframe. Manually inputting the enablement state values for each selective program components, either Enabled (E) or Disabled (D), takes the system administrator hours to complete, and the enablement state values need to be input to the z/OSMF for each system administration task that requires information on enablement state values of the selective program components. To improve system administration efficiency, the z/OSMF offers a workflow input variable file, which includes workflow input variables and respective values that may be automatically input to a workflow having a variable corresponding to any of the workflow input variables.

In block 320, the Workflows task runs Step 0 of the workflow created from block 310. Step 0 is referred to as "Discovery Step 0" because the step 0 discovers whether each selective program component installed in the z/OS mainframe is enabled or disabled by checking respective enablement state values of the selective program components. Discovery Step 0 further makes the enablement state value per selective program component resulting from the step 0 available by writing it into an output file of the workflow. See FIG. 5 and corresponding description for details of Discovery Step 0. Then the Workflows task proceeds with block 320.

In one embodiment of the present invention, the system administrator clicks Step 0 of the workflow in the Workflows task via the z/OSMF user interface web browser plug-in to commence running of Step 0, which appears as in a state "Ready" indicating that Step 0 may be run. Step 0 is a mandatory step that the customer must complete before they can complete any steps related to the Priced Features. Because Step 0 is to discover enablement state values of respective selective program components as noted, Step 0 must be performed prior to performing subsequent steps relevant to the selective program components in the workflow. Prior to running Step 0, all of the subsequent steps are in a state "Not Ready" indicating that the subsequent steps may not be run. When Step 0 is completed and the enablement state values of respective selective program components are provided, the subsequent steps state may change to "Ready" if the subsequent steps are otherwise ready.

In block 330, the Workflows task adds workflow input variables represented respective registered products having enablement state value of Disabled (D) as stored in the output file resulting from block 320 to a global variables pool, which makes the workflow input variables representing registered products that are disabled globally available to any subsequent steps in the workflow as well as other workflows having the same workflow input variables. Then the Workflows task completes processing.

In one embodiment of the present invention, the Discovery Step 0 is added to all workflows checking product components, selective or mandatory, hardware or software. If a product component is found to be disabled, subsequent steps related to the disabled product component may be automatically omitted, resulting in a significantly less number of steps in a workflow that the system administrator needs to complete while running the workflow. Further, the workflow may be completed more accurately as input errors caused by manual input can be removed in running the workflow.

In another embodiment of the present invention, all workflows of the z/OSMF are created according to a respective workflow definition that includes variables to be generated by a program of Step 0, conditions marked by <expression>, <targetStateSet>, and <stateExpression> tags such that the workflows are enabled to set each step of the workflows as either "Ready", when all relevant variables have "Enabled (E)" values, or "Skipped", when any relevant variable has a "Disabled (D)" value.

Figure 5:
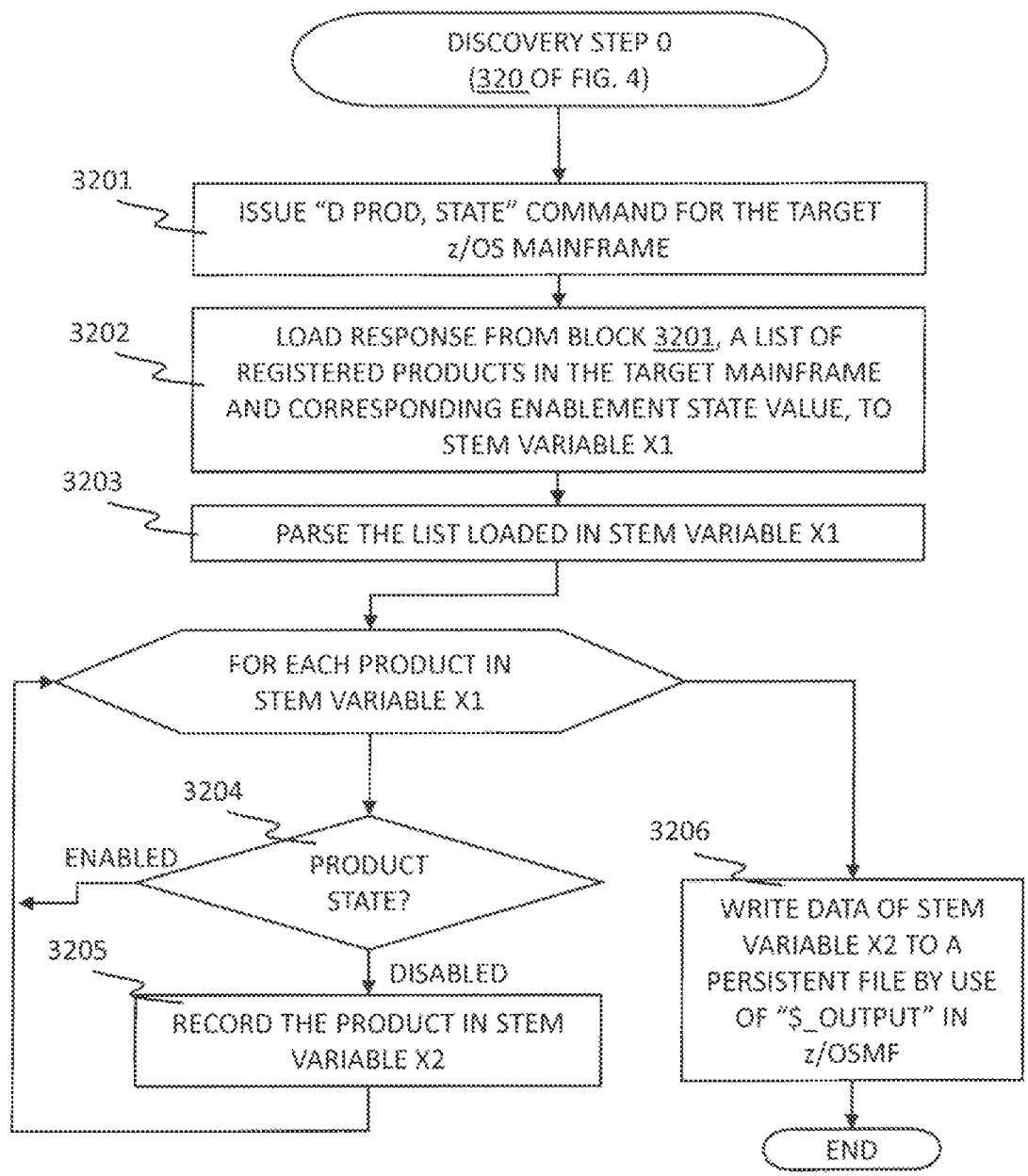
FIG. 5 depicts a flowchart of block 320, Discovery Step 0, of the Workflows Task of FIG. 4, in accordance with one or more embodiments set forth herein.

FIG. 5 depicts a flowchart of block 320, Discovery Step 0, of the Workflows Task of FIG. 4, in accordance with one or more embodiments set forth herein.

In one embodiment of the present invention, Discovery Step 0 of block 320 in FIG. 4 is implemented as a Restructured Extended Executor (REXX) exec, which is a script in the REXX programming language. When the system administrator clicks Step 0, a job that runs the REXX exec located on the z/OS mainframe is submitted to and executed by the MVS (BCP), by use of the job entry and monitoring subsystems (JES/SDSF, 251 of FIG. 2) and the parameter library (PARMLIB, 252 of FIG. 2).

Prior to block 3201, the REXX exec starts a RUN_CHECK routine to ascertain if the system environment is proper for running the REXX exec. Details of REXX exec running environment is not provided in this specification as not being relevant to the embodiments of the present invention.

In block 3201, the REXX exec issues "D PROD, STATE" command to find out enablement state values for all "registered products" installed in the z/OS mainframe. The "D PROD, STATE" command is issued to an extended multiple console support (EMCS) console of the JES, which is a program that acts as a console such that a MVS system command "D PROD, STATE" may be issued to the EMCS console by the REXX exec and a response to the issued command may be received by the REXX exec that issued the "D PROD, STATE" command. See FIG. 3 and corresponding description for details of "D PROD, STATE" command and the response. As a result, the REXX exec receives the enablement state values, Enabled (E) or Disabled (D), corresponding to all registered products installed in the z/OS mainframe. For example, there are more than fifty (50) base elements and optional features, collectively referred to as registered products, in the z/OS product set of z/OS 2.1. Then the REXX exec proceeds with block 3202.

In block 3202, the REXX exec loads a list of registered products installed in the z/OS mainframe and respectively corresponding enablement state values as returned from block 3201 to a stem variable x1. Stem is a type of compound variable supported by REXX, which functions like an array. Then the REXX exec proceeds with block 3203.

In block 3203, the REXX exec parses the list loaded in the stem variable x1 from block 3202. For each registered product of stem variable x1, the REXX exec performs blocks 3204 and 3205. When all registered products of stem variable x1 are processed the REXX exec proceeds with block 3206.

In block 3204, the REXX exec determines if an enablement state value for a current registered product of stem variable x1 is Enabled (E). If the REXX exec determines that the enablement state value for the current registered product of stem variable x1 is Enabled (E), then the REXX exec repeats block 3204 for a next registered product of stem variable x1. If the REXX exec determines that the enablement state value for the current registered product of stem variable x1 is Disabled (D), then the REXX exec proceeds with block 3205.

In block 3205, the REXX exec records the current registered product of stem variable x1 in stem variable x2, which stores a list of registered products of which respective enablement state value is Disabled (D). Then the REXX exec loops back to block 3204.

In block 3206, the REXX exec writes data in stem variable x2, for disabled products, to a persistent file by use of "$_output" expression in the z/OSMF. In z/OSMF, "$_output" corresponds to a file path specified by the <output> tags in the workflow definition, dictating the name and location of the output file. In one embodiment of the present invention, the workflow definition file specifies $_output as:

<output>/tmp/var_inputfile.txt</output>
for/tmp/directory is present in most of file systems. Then the REXX exec implementing Discovery Step 0 terminates and the Workflow task continues processing in block 330 of FIG. 4.

Certain embodiments of the present invention may offer various technical computing advantages, including automating system administration tasks in mainframe computing environments and substituting manual operations to perform enablement state check of all components installed in a mainframe computer with automated skipping of disabled components in workflows. Certain embodiments of the present invention implement automated maintenance of enablement state values corresponding to respective components to be repeatedly used in subsequent system administration tasks, and improves accuracy of system administration tasks by automatic enablement state value check and instantiation of input variables by use of embedded system interface functionalities, and consequently improve productivity of the mainframe computers that would have been held up by the inefficient systems administration tasks for installation, configuration and migration of such mainframe computers.

Certain embodiments of the present invention enables establishing a reusable system program element in a specific mainframe computing environment that may be employed in numerous other system administration tasks. Accordingly, the same embodiments of the present invention offer ways to perform numbers system administration tasks in configuration, installation and migration of the mainframe computers in a time-efficient and less error-prone manner by employing the reusable system program element without spending hours to interactively reproduce the result created by the reusable system program. Further, certain embodiments of the present invention may improve efficiency and convenience of system administration by utilizing an existing interface for management in the mainframe computing environment, and consequently improvement in mainframe productivity and system administrator work efficiency would be substantial in intensive computing environments with multiple mainframes such as server farms, data centers, etc.

Figure 6:
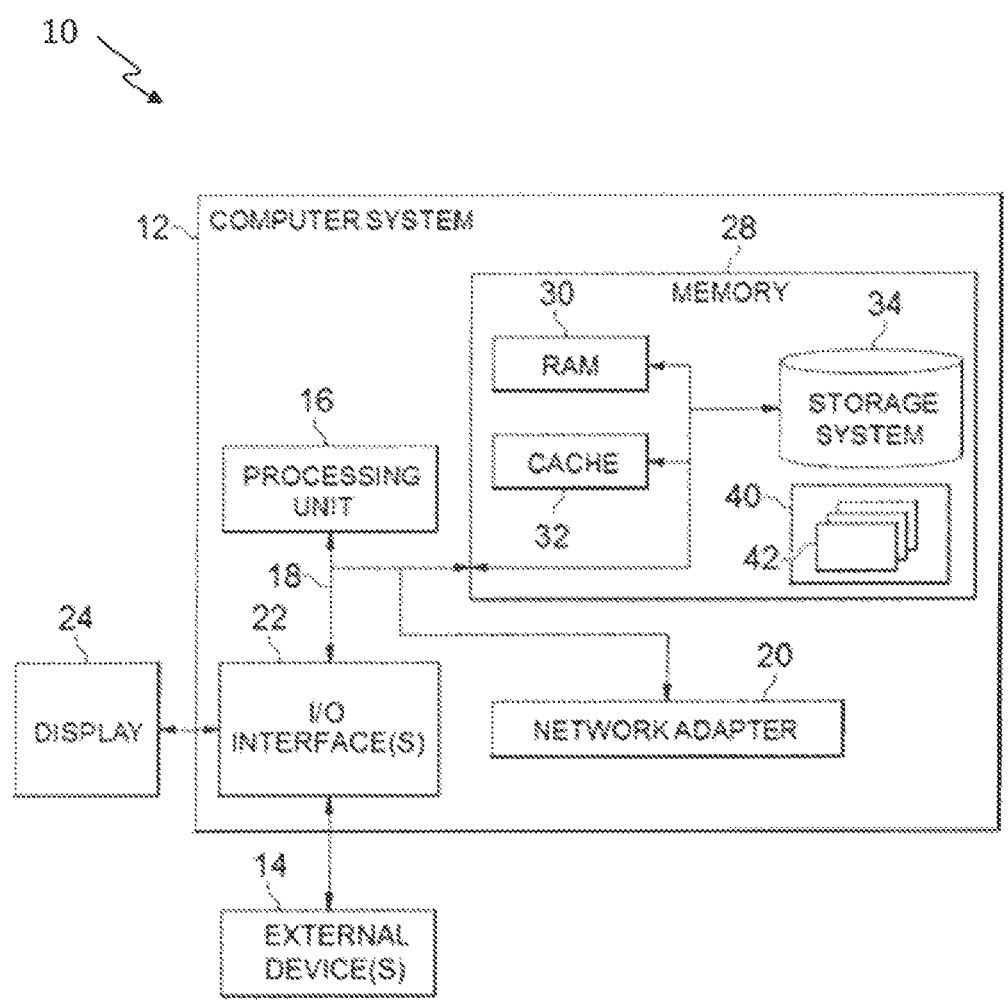
FIG. 6 depicts a cloud computing node according to an embodiment of the present invention.
Figure 7:
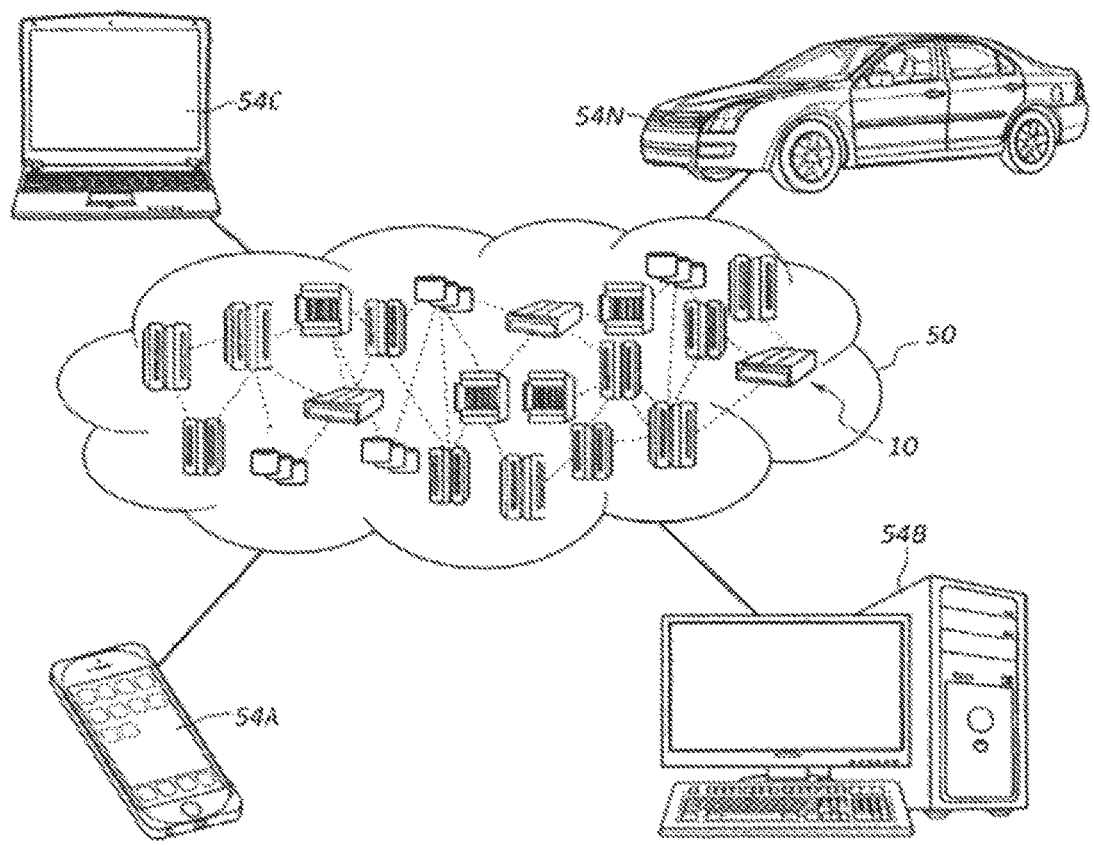
FIG. 7 depicts a cloud computing environment according to an embodiment of the present invention.
Figure 8:
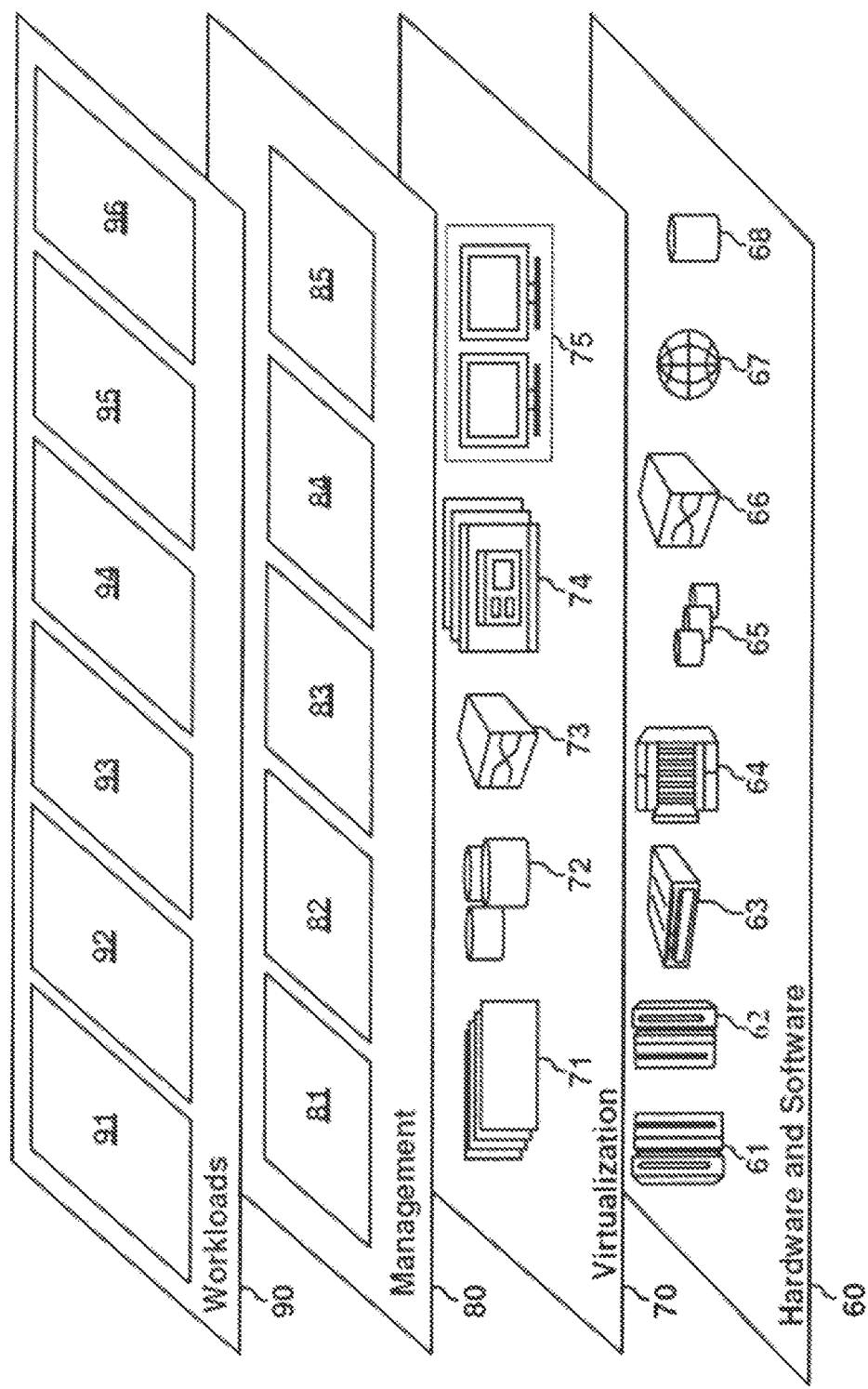
FIG. 8 depicts abstraction model layers according to an embodiment of the present invention.

FIGS. 6-8 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 6, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system 12 in cloud computing node 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

One or more program 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of z/OSMF 232 of FIG. 2. Program modules 42, as in the Workflows task 233 of FIG. 2 and Discovery Step 0 of FIG. 5, generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91;

software development and lifecycle management 92; virtual classroom education delivery 93; data analytics processing 94; transaction processing 95; and processing components for an automated system administration for mainframe computers 96, as described herein. The processing components 96 can be understood as one or more program 40 described in FIG. 6.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method for automating enablement state inputs to workflows, comprising:
    automatically discovering, by one or more processor of a computer, respective values for one or more enablement state variable respectively corresponding to one or more product installed in the computer, wherein a value of an enablement state variable corresponding to an installed product indicates whether the product is enabled or disabled in the computer, and storing results from the automatically discovering;
    loading, by the one or more processor, the stored results from the discovering including a list of installed products, the one or more enablement state variable respectively corresponding to each of the installed products, and the discovered respective values of the one or more enablement state variable to a first list, wherein the first list is a compound variable in the computer;
    parsing, by the one or more processor, the loaded first list into each installed product, each of the one or more enablement state variable respectively corresponding to each installed product, and the discovered respective values for the each of the one or more enablement state variable from the discovering;
    recording, by the one or more processor, to a second list, a first enablement state variable and a value corresponding to the first enablement state variable in the first list based on ascertaining, in the first list from the parsing, that a first product corresponding to the first enablement state variable is disabled in the computer; and
    writing, by the one or more processor, the second list from the recording to an output file in a filesystem of the computer that is persistent and global in the computer, wherein the output file is located by a path in the filesystem, and wherein the respective values for the enablement state variables corresponding to the disabled products as written in the output file is automatically provided to subsequent system administration jobs without user interaction by use of respective enablement state variable corresponding to the one or more disabled product in the output file.

2. The computer implemented method of claim 1, further comprising:
    creating, by the one or more processor, a workflow comprising a step invoking the automatically discovering, the loading, the parsing, the recording, and the writing, as a unit, based on a workflow definition stored in a workflow definition file, the workflow definition comprising the one or more enablement state variable specified as respective workflow input variable, wherein a workflow input variable is configured to be automatically instantiated by an administration tool running on the computer, by use of the workflow definition further comprising the path of the output file within a filesystem of the computer.

3. The computer implemented method of claim 2, wherein the workflow definition further comprises conditions that sets a step of the workflow as either Ready upon ascertaining that all enablement state variable required for the step have Enabled value or Skipped upon ascertaining that any enablement state variable required for the step has Disabled value.

4. The computer implemented method of claim 3, wherein the workflow definition file is written in extensive markup language (XML), and wherein the conditions in the workflow definition utilizes <expression>, <targetStateSet>, and <stateExpression> tags.

5. The computer implemented method of claim 1, wherein the automatically discovering, the loading, the parsing, the recording and the writing are instructions in a script in Restructured Extended Executor (REXX) programming language, wherein the computer is an IBM z Systems mainframe computer running z/OS operating system, and wherein the administration tool is z/OS Management Facility (z/OSMF).

6. The computer implemented method of claim 5, the automatically discovering comprising issuing a system command "D PROD, STATE" to an extended multiple console support (MCS) console subroutine of the z/OS such that a response to the system command may be loaded to the first list, wherein "D" indicates the system command is to display information, "PROD" indicates that the system command is directed to information about registered products, and "STATE" indicates that the system command is directed to information about the enablement state for any matching products.

7. The computer implemented method of claim 5, wherein the first list and the second list are respective stem variables of REXX facilitating a data structure similar to an array.

8. A system comprising:
    a memory;
    one or more processor in communication with memory; and program instructions executable by the one or more processor via the memory to perform a method for automating enablement state inputs to workflows, comprising:

automatically discovering, by the one or more processor, respective values for one or more enablement state variable respectively corresponding to one or more product installed in a computer, wherein a value of a enablement state variable from the one or more enablement state variable indicates whether a product corresponding to the enablement state variable is enabled in the computer, and storing results from the automatically discovering;

loading, by the one or more processor, the stored results from the discovering including a list of installed products, the one or more enablement state variable respectively corresponding to each of the installed products, and the discovered respective values of the one or more enablement state variable to a first list, wherein the first list is a compound variable in the computer;

parsing, by the one or more processor, the loaded first list into each installed product, each of the one or more enablement state variable respectively corresponding to each installed product, and the discovered respective values for the each of the one or more enablement state variable from the discovering;

recording, by the one or more processor, to a second list, a first enablement state variable and a value corresponding to the first enablement state variable in the first list based on ascertaining, in the first list from the parsing, that a first product corresponding to the first enablement state variable is disabled in the computer; and writing, by the one or more processor, the second list from the recording to an output file in a filesystem of the computer that is persistent and global in the computer, wherein the output file is located by a path in the filesystem, and wherein the respective values for the enablement state variables corresponding to the disabled products as written in the output file is automatically provided to subsequent system administration jobs without user interaction by use of respective enablement state variable corresponding to the one or more disabled product in the output file.

9. The system of claim 8, further comprising:

creating, by the one or more processor, a workflow comprising a step invoking the automatically discovering, the loading, the parsing, the recording, and the writing, as a unit, based on a workflow definition stored in a workflow definition file, the workflow definition comprising the one or more enablement state variable specified as respective workflow input variable, wherein a workflow input variable is configured to be automatically instantiated by an administration tool running on the computer, by use of the workflow definition further comprising the path of the output file within a filesystem of the computer.

10. The system of claim 9, wherein the workflow definition further comprises conditions that sets a step of the workflow as either Ready upon ascertaining that all enablement state variable required for the step have Enabled value or Skipped upon ascertaining that any enablement state variable required for the step has Disabled value.

11. The system of claim 10, wherein the workflow definition file is written in extensive markup language (XML), and wherein the conditions in the workflow definition utilizes <expression>, <targetStateSet>, and <stateExpression> tags.

12. The system of claim 8, wherein the automatically discovering, the loading, the parsing, the recording and the writing are instructions in a script in Restructured Extended Executor (REXX) programming language, wherein the computer is an IBM z Systems mainframe computer running z/OS operating system, and wherein the administration tool is z/OS Management Facility (z/OSMF).

13. The system of claim 12, the automatically discovering comprising issuing a system command "D PROD, STATE" to an extended multiple console support (MCS) console subroutine of the z/OS such that a response to the system command may be loaded to the first list, wherein "D" indicates the system command is to display information, "PROD" indicates that the system command is directed to information about registered products, and "STATE" indicates that the system command is directed to information about the enablement state for any matching products, and wherein the first list and the second list are respective stem variables of REXX.

14. A computer implemented method comprising:

obtaining, by one or more processor of a computer, contents of a program component catalog in an operating system of the computer, wherein the contents of the program component catalog include one or more program components installed in the computer and a value for enablement state corresponding to each program component in the program component catalog, wherein a value for enablement state of a program component indicates that the program component corresponding to the value for enablement state is either enabled or disabled in the computer;

creating, by the one or more processor, a first list based on the contents of the program component catalog from the obtaining, wherein the first list includes the one or more program components installed in the computer and respective values for enablement state of respective program components;

examining, by the one or more processor, each pair of the program component and the value for enablement state for the program component in the first list from the creating;

ascertaining, by the one or more processor, that the value for enablement state for the program component indicates that the program component is disabled in the computer;

recording, by the one or more processor, to a second list, the program component and the value for enablement state for the program component from the ascertaining; and writing, by the one or more processor, the second list from the recording to an output file in a filesystem of the computer that is persistent and global in the computer, wherein the output file is located by a path in the filesystem, and wherein the output file is accessible for subsequent system administration jobs to automatically provide the respective values for the enablement state corresponding to program components disabled in the computer without user interaction.

15. The computer implemented method of claim 14, further comprising:

creating, by the one or more processor, a workflow comprising a step invoking the obtaining, the creating, the examining, the ascertaining, the recording and the writing, as a unit, based on a workflow definition stored in a workflow definition file, wherein the workflow definition comprises respective workflow input variables representing respective values for enablement state for a set of program components amongst the one or more program component installed in the computer and the path of the output file within a file system of the computer, and wherein the respective workflow input variables of the workflow definition file are configured to be automatically instantiated by an administration tool running on the computer by use of the path of the output file in the workflow definition.

16. The computer implemented method of claim 15, wherein the computer is an IBM z Systems mainframe computer running a z/OS operating system, and wherein the administration tool is a z/OS Management Facility (z/OSMF), and wherein the workflow definition further comprises conditions that sets a step of the workflow as either Ready upon ascertaining that all values for enablement state of the set of program components required for the step have Enabled value or Skipped upon ascertaining that any enablement state variable required for the step has Disabled value.

17. The computer implemented method of claim 16, wherein the obtaining comprises:

issuing a system command "D PROD, STATE" to an extended multiple console support (MCS) console subroutine of the z/OS for display the content of program component catalog including the respective values for enablement state for all program component installed in the IBM z Systems mainframe computer; and storing a result of the system command from the issuing into a compound variable that implements the first list.

18. The computer implemented method of claim 17, wherein the first list and the second list are respective stem variables of the Restructured Extended Executor (REXX) programming language facilitating a data structure similar to an array.

19. The computer implemented method of claim 18, wherein the workflow definition of the z/OS Management Facility (z/OSMF) is in the Extensible Markup Language (XML).

* * * * *